United States Patent
Hudson et al.

(10) Patent No.: US 7,264,840 B2
(45) Date of Patent: *Sep. 4, 2007

(54) PROCESS OF MAKING A SCRAMBLED EGG SNACK FOOD

(75) Inventors: Margaret F. Hudson, Toronto (CA); Phillip Lee Wing, Markham (CA)

(73) Assignee: Burnbrae Farms Limited, Lyn, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 11/110,664

(22) Filed: Apr. 21, 2005

(65) Prior Publication Data

US 2005/0186322 A1    Aug. 25, 2005

Related U.S. Application Data

(62) Division of application No. 10/621,518, filed on Jul. 18, 2003, now Pat. No. 7,229,660.

(60) Provisional application No. 60/406,320, filed on Aug. 28, 2002, provisional application No. 60/396,556, filed on Jul. 18, 2002.

(51) Int. Cl.
*A23L 1/32* (2006.01)

(52) U.S. Cl. .................................. 426/614; 426/94
(58) Field of Classification Search ................ 426/614, 426/516, 96
See application file for complete search history.

(56) References Cited

U.S. PATENT DOCUMENTS 4,469,708 A * 9/1984 Rapp et al. .................. 426/103
6,228,405 B1 * 5/2001 Walsh et al. ................. 426/241

FOREIGN PATENT DOCUMENTS

JP    4-20265    *    1/1992

OTHER PUBLICATIONS

URSCHEL Laboratories Incorporated Website. Mar. 2003. http://www.urschel.com/machines.php?mid=26.*
Copending U.S. Appl. No. 10/520,275, filed Jan. 18, 2005.*
Copending U.S. Appl. No. 11/188,747, filed Jul. 26, 2005.*

* cited by examiner

*Primary Examiner*—Anthony Weier
(74) *Attorney, Agent, or Firm*—Michael I. Stewart; Sim & McBurney

(57) ABSTRACT

A snack food product having a shaped core of a coherent mass of scrambled eggs enrobed in a breaded batter coating.

14 Claims, No Drawings

PROCESS OF MAKING A SCRAMBLED EGG SNACK FOOD

REFERENCE TO RELATED APPLICATIONS

This application is a division of U.S. patent application Ser. No. 10/621,518 filed Jul. 18, 2003 now U.S. Pat. No. 7,229,660 which claims priority under 35 USC 119(e) from U.S. Provisional Patent Applications Nos. 60/396,556 filed Jul. 18, 2002 and 60/406,320 filed Aug. 28, 2002.

FIELD OF INVENTION

The present invention relates to a scrambled egg snack food.

BACKGROUND TO THE INVENTION

Eggs are highly nutritious and have been prepared in many ways, with various spices and sauces to further enhance their natural appealing taste, aroma and appearance.

A search of the prior art with respect to the subject matter hereof has resulted in location of U.S. Pat. Nos.: 3,650,766, 4,469,708, 6,165,522, 6,261,611, 6,261,625 and 6,326,039.

SUMMARY OF INVENTION

The present invention provides a scrambled egg snack food and procedure for making the same. The snack food is a convenient egg product that can be prepared for consumption by frying, baking or microwave. The product consists of a core of scrambled egg, which may be formulated with a variety of particulates to provide specific tastes, enrobed with a coating of batter and breading. Particulates which may be formulated with the scrambled egg include cheese, bacon, onion, ham and vegetables.

In accordance with one aspect of the present invention, there is provided a snack food product comprising a shaped core of a coherent mass of scrambled egg and an outer batter coating, preferably also breaded.

In accordance with a further aspect of the present invention, there is provided a method of forming a snack food product, which comprises:

partially scrambling eggs, mixing at least one food grade binder with the partially scrambled eggs, fully cooking the scrambled eggs, shaping the fully cooked scrambled eggs, and battering and preferably breading the shaped scrambled eggs.

GENERAL DESCRIPTION OF THE INVENTION

As indicated above, the present invention provides a novel snack food which has a core of scrambled eggs. The core may be produced from whole egg which generally comprises about 70 to about 80 wt % of the core.

In one preferred embodiment of the invention, the egg may contain omega-3 (n-3) fatty acids, as fully described in copending U.S. patent application Ser. No. 10/094,962 filed Mar. 12, 2002 (WO 02/080703), assigned to the assignee hereof and the disclosure of which is incorporated herein by reference. The egg may contain about 100 to about 1500 mg of omega-3 fatty acid per 100 g of egg, preferably about 500 to about 1000 mg of omega-3 fatty acid. The omega-3 fatty acid may be provided by fish oil, emulsified in the liquid egg, although other sources of omega-3 fatty acids may be used.

The core is given sufficient structural integrity to permit battering and breading by the addition of at least one food grade binder. Such food grade binder may be liquid albumen or gelatin, preferably both. Generally, the weight ratio of food grade binder to egg is about 0.05:1 to about 0.15:1, preferably about 0.08:1 to about 0.1:1. The liquid albumen is generally used in an amount of about 6 to about 7 wt % of the core while the gelatin is generally used in an amount of about 0.5 to about 1 wt %.

The core may include seasonings, such as salt and pepper. When present, the weight ratio of the seasonings to egg is generally about 0.01:1 to about 0.03:1, preferably about 0.015:1 to about 0.025:1. When used, salt is generally present in an amount of about 1 to about 2 wt % and pepper is an amount of about 0.01 to about 0.05 wt %.

Other ingredients may be included to assist in preparation of scrambled eggs from the liquid whole egg. Such production assistance ingredients may include edible oil, such as canola oil, water, citric acid, xanthan gum, skim milk powder and modified starch. Citric acid may be added to stabilize the colour of the egg core. Gum and starch may be added to assist in moisture control during freezing and thawing.

The weight ratio of such production assistance ingredients to egg generally is about 0.1:1 to about 0.3:1, preferably about 0.13:1 to about 0.27:1. When present, such ingredients may be present in the weight percentages set forth in the following Table I:

TABLE I

| Ingredients | wt % of core |
| --- | --- |
| Edible Oil | about 0.5 to about 1 |
| Water | about 5 to about 15 |
| Citric Acid | about 0.01 to about 0.1 |
| Xanthan Gum | about 0.2 to about 0.3 |
| Skim Milk Power | about 2.5 to about 3 |
| Modified Starch | about 1 to about 2 |

As mentioned above, other particulates may be formulated with the egg core to impart specific flavours to the product. The amount of such other particulates present depends on the nature of the particulates used. One such additive is cheese particulates, which may be present in an amount of about 4 to about 6 wt % of the core. Another such solution is bacon pieces, which may be present in an amount of about 1 to about 2 wt % of the core.

Formulations of ingredients of the core which may be used include those set forth in the following Tables II, III and IV:

TABLE II

| Ingredient | wt % |
| --- | --- |
| Whole Egg | about 70 to about 80 |
| Oil | about 0.56 to about 1 |
| Water | about 5 to about 15 |
| Salt | about 1 to about 2 |
| Citric Acid | about 0.05 to about 0.10 |
| Xanthan Gum | about 0.2 to about 0.3 |
| Skim Milk Powder | about 2.5 to about 3.0 |
| Modified Starch | about 1 to about 1.5 |
| Pepper Oleoresin | about 0.05 to about 0.10 |
| Liquid Albumen | about 6 to about 7 |
| Gelatin | about 0.5 to about 1 |

TABLE III

| Ingredient | wt % |
| --- | --- |
| Whole Egg | about 70 to about 80 |
| Oil | about 0.56 to about 1 |
| Water | about 5 to about 15 |
| Salt | about 1 to about 2 |
| Citric Acid | about 0.01 to about 0.09 |
| Xanthan Gum | about 0.2 to about 0.3 |
| Skim Milk Powder | about 2.5 to about 3.0 |
| Modified Starch | about 1 to about 2 |
| Pepper Oleoresin | about 0.01 to about 0.05 |
| Cheese Particulates | about 4 to about 6 |
| Liquid Albumen | about 6 to about 7 |
| Gelatin | about 0.5 to about 1 |

TABLE IV

| Ingredient | wt % |
| --- | --- |
| Whole Egg | about 70 to about 80 |
| Oil | about 0.56 to about 1 |
| Water | about 5 to about 15 |
| Salt | about 1 to about 2 |
| Citric Acid | about 0.01 to about 0.09 |
| Xanthan Gum | about 0.2 to about 0.3 |
| Skim Milk Powder | about 2.5 to about 3.0 |
| Modified Starch | about 1 to about 2 |
| Pepper Oleoresin | about 0.01 to about 0.05 |
| Bacon Pieces | about 1 to about 2 |
| Liquid Albumen | about 6 to about 7 |
| Gelatin | about 0.5 to about 1 |

The core is enrobed with a coating of batter and breading. A predust may be applied to the scrambled egg core prior to battering and breading. Any batter conventionally used to batter food products may be used. Such batters generally contain flours of different sources, modified food starch, hydrophilic colloids and water as well as various spices, seasonings and colourings. Similarly, breading may be effected using any bread crumbs conventionally used to bread food products.

In general, the weight ratio of breading and batter to egg core is about 0.1:1 to about 0.3:1, preferably 0.15:1 to about 0.25:1. The components may be used in the amounts set forth in the following Table V:

TABLE V

| Ingredient | wt % |
| --- | --- |
| Egg Core | about 70 to about 80 |
| Predust | about 1 to about 3 |
| Batter and Water | about 6 to about 10 |
| Breading | about 6 to about 8 |

In producing the product of the invention, whole eggs, which may be admixed with seasonings and other additives, are initially partially scrambled, at least one food grade binder for the scrambled eggs is added and thoroughly mixed with the scrambled eggs, and then the eggs are fully scrambled. In carrying out this procedure, seasonings and other ingredients as described above are thoroughly mixed into blended liquid whole egg, preferably at a cool temperature of about 5° to about 10° C., before cooling to refrigeration temperature (4° C. and below).

To cook the stock base so formed, the stock base may be heated to a temperature of about 50° to about 80° C., preferably about 60° to about 70° C., taking about 20 to about 50 minutes, preferably 30 to about 40 minutes, to form a partially scrambled egg product which is wet, moist and paste-like or curd-like.

The stock base may be pre-tempered to a temperature of about 5° to about 20° C., preferably about 10° to about 15° C., taking about 60 to about 200 minutes, preferably about 90 to about 180 minutes, since such pre-tempering has been found to provide improved temperature distribution during cooking and setting of starches and gums present for viscosity control.

The food grade binder(s) are added to the partially cooked eggs and evenly distributed therein. The resulting mixture then is heated to a higher temperature of about 60° to about 85° C., preferably about 70° to about 80° C., taking about 3 to about 20 minutes, preferably 7 to about 15 minutes, until the cooked eggs appear to be dry and have a pleasant yellow colour. The fully cooked eggs then are cooled to refrigeration temperatures.

The cooked eggs may be mixed to break up any lumps which may have formed during the cooking step. When flavouring particulates are to be added, they may be added at a convenient step of the cooking procedure, depending on the nature of the material added. For example, bacon pieces may be added to the partially scrambled eggs and distributed therein prior to addition of the food grade binder. If cheese particulates are used, they conveniently are added to cooled cooked eggs.

The mixture then is extruded, using any desired extruder, in any desired cross-sectional shape and size followed by cutting into the desired longitudinal length. The egg generally is extruded in a cooled condition, generally about 2° to about 18° C., preferably about 5° to about 10° C.

The extruded product may then be battered and breaded. Alternatively, the extruded product may be frozen for later battering and breading. The extruded product may be seasoned prior to battering and breading.

Alternatively, the cooked product may be formed into the desired shape by any other convenient procedure than extrusion.

The extrusion of the cooked product may be effected into an edible or inedible casing to provide additional structural integrity to the extruded mass until frozen. Where an inedible casing is used, this casing is removed when the extruded mass has been frozen. Where an edible casing is used, this may remain in contact with the extruded mass. Alternatively, the extrusion operation may be carried out without a casing.

The ratio of coating to scrambled egg filling is variable depending on the shape of the product. In providing the breaded coating, the frozen egg products, which may be in the form of fingers or nuggets of various cross-sectional shapes, are coated with a predust, after an initial moistening or tempering of the surface. The egg products then are dipped into prepared batter and transferred to a breading operation. The battered products are completely coated with breading. The final product then is frozen for packaging. Alternatively, the product may be par-fried, for example for 20 seconds at 200° C., prior to freezing.

The novel scrambled egg product provided herein may be in the form of cylindrical fingers about 1.8 to 2.5 cm in diameter and about 5 cm long, although other dimensions and shapes may be used, as discussed above. The products have a long frozen shelf life of about 6 to 12 months.

The frozen egg products may be reheated for consumption by frying, oven heating or by microwave. In a frying procedure, frying oil may be preheated to about 180° C. and the frozen fingers or nuggets placed in the preheated oil and fried for 4 minutes or until golden brown. The cooked egg fingers or nuggets are drained and served. In an oven cooking procedure, the oven may be preheated to 190° C., the frozen egg fingers or nuggets placed on a tray and baked for 20 minutes. The baked egg fingers or nuggets are then served. In a microwave procedure, the egg products may be reheated for 30 seconds on HIGH in a 1000 W microwave.

The reheated egg fingers or nuggets have a medium egg flavour inside and a toasted flavour from the coating. The reheated egg fingers or nuggets have a crispy outer coating and a soft moist core with small egg pieces. The egg fingers or nuggets have a pale tan colour which can be formulated to turn golden brown with cooking. The interior of the reheated egg fingers or nuggets is a pale yellow colour with visible egg pieces.

The novel egg product of the invention, therefore, is a convenient, egg snack food product that can be reheated through frying, baking or microwave for consumption.

EXAMPLES

Example 1

This Example illustrates one embodiment of egg product provided in accordance with the invention.

Egg nuggets (fingers) were prepared comprising approximately 80 wt % egg filling and approximately 20 wt % coating. The formulations of the egg core and the nuggets are set forth in the following Tables VI and VII:

TABLE VI

| Ingredient | wt % |
| --- | --- |
| Whole Egg | 76.28 |
| Canola Oil | 0.92 |
| Water | 9.19 |
| Salt | 1.5 |
| Citric Acid | 0.05 |
| Xanthan Gum | 0.28 |
| Skim Milk Powder | 2.76 |
| Modified Starch | 1.38 |
| Pepper Oleoresin | 0.09 |
| Liquid Albumen | 6.86 |
| Gelatin | 0.69 |
| Total | 100.00 |

TABLE VII

| Product | |
| --- | --- |
| Ingredient | wt % |
| Egg Core | 78.42 |
| Predust | 1 |
| Batter + Water | 7.80 |
| Breading | 7.80 |
| Par-fry Oil Pickup | 3.55 |

Whole eggs were blended with a dry mix of citric acid, salt, skim milk powder and xanthan gum at about 5° to 6° C. followed by the addition of modified starch, oil, water and pepper. The mixture was agitated for about 10 minutes and cooled immediately to below 4° C. to provide a stock base.

The stock base was pre-tempered to 10° to 15° C. in about 180 minutes to permit improved temperature distribution during cooking and setting of starch and gums. The pre-tempered stock base then was heated in a cooker to 68° C. At 68° C., the partly scrambled egg is wet, moist and paste-like. When this condition is reached in about 30 to 40 minutes cooking time, liquid albumen, pre-tempered at 10° to 15° C., containing gelatin was added evenly onto the scrambled egg and mixed therewith.

The cooker temperature was then adjusted to 105° C. and the eggs cooked for another 7 minutes or until the eggs looked dry and had a pleasant yellow colour to provide a scrambled egg product having a temperature of about 75° C.

The cooked scrambled eggs were cooled to below 4° C. for extrusion. The cooled scrambled eggs at 10° C. were extruded using a Vemag extruder and the extruded mass cut into pieces to provide egg pieces sized 1.9 cm×3.8 cm. The extruded cores were frozen to a temperature of about −25° C.

Egg cores were tempered at about 20° C. until the surface temperature of the cores reached about 0° C. Egg cores were then transferred to a breading line conveyor. Cores were first coated with a predust at a rate of about 1 wt %. Dusted egg cores were then immersed in a batter held at a temperature of about 6.5° C. Immediately after applying the batter, the cores were coated with breading. The total pickup of the batter and breading was at a rate of about 22 wt %. Once breaded, egg cores were par-fried for 30 seconds at 200° C., frozen and then packaged.

Example 2

This Example illustrates another embodiment of egg product produced in accordance with the invention.

The procedure of Example 1 was repeated except that cheese particulates were blended into the cooled scrambled egg prior to extrusion, using a dough mixer, tumbling gently.

The formulation of the egg core is set forth in the following Table VIII:

TABLE VIII

| Egg Core | |
| --- | --- |
| Ingredient | wt % |
| Whole Egg | 72.48 |
| Canola Oil | 0.88 |
| Water | 8.76 |
| Salt | 0.79 |
| Citric Acid | 0.02 |
| Xanthan Gum | 0.27 |
| Skim Milk Powder | 2.62 |
| Modified Starch | 1.32 |
| Pepper Oleoresin | 0.01 |
| Cheese Particulate | 5.67 |
| Liquid Albumen | 6.53 |
| Gelatin | 0.65 |
| Total | 100.00 |

The formulation of the nuggets was the same as in Example 1.

Example 3

This Example illustrates another embodiment of egg product produced in accordance with the invention.

The procedure of Example 1 was repeated except that bacon pieces were added to the partially scrambled egg prior to adding the liquid albumen and gelatin.

The formulation of the egg core as set forth in the following IX:

TABLE IX

Egg Core

| Ingredient | wt % |
|---|---|
| Whole Egg | 75.16 |
| Canola Oil | 0.92 |
| Water | 9.18 |
| Salt | 0.76 |
| Citric Acid | 0.02 |
| Xanthan Gum | 0.28 |
| Skim Milk Powder | 2.75 |
| Modified Starch | 1.38 |
| Pepper Oleoresin | 0.01 |
| Bacon Pieces | 2.06 |
| Liquid Albumen | 6.80 |
| Gelatin | 0.68 |
| Total | 100.00 |

The formulation of the nuggets was the same as in Example 1.

SUMMARY OF THE DISCLOSURE

In summary of this disclosure, the present invention provides a novel egg product comprising a scrambled egg filling and breaded coating. Modifications are possible within the scope of this invention.

What we claim is:

1. A method of forming a snack food product, which comprises:
    partially scrambling eggs,
    mixing at least one food grade binder with the partially scrambled eggs,
    fully cooking the scrambled eggs,
    shaping the fully-cooked scrambled eggs, and
    battering the shaped scrambled eggs.

2. The method of claim 1 wherein a stock base is formed prior to the partially scrambling step by mixing seasonings and production assistance ingredients with a mass of liquid eggs.

3. The method of claim 2 wherein the mixing is effected at a temperature of about 5° to about 10° C.

4. The method of claim 2 wherein the stock base is heated to a temperature of about 50° to about 80° C. taking about 20 to 50 minutes to form the partially scrambled egg which is wet, moist end pastelike.

5. The method of claim 4 wherein the stock base is heated to a temperature of about 60° to about 70° C. taking about 30 to about 40 minutes.

6. The method of claim 4 wherein the stock base is pretempered at a temperature of about 5° to about 20° C. taking about 60 to about 200 minutes prior to said heating step.

7. The method of claim 5 wherein the stock base is pretempered at a temperature of about 10° to about 15° C. taking about 90 to about 180 minutes prior to said heating step.

8. The method of claim 4 wherein, following mixing at least one food grade binder with the partially-scrambled egg, the partially scrambled egg is fully cooked by heating to a temperature of about 60° to about 85° C. taking about 3 to about 20 minutes until the cooked eggs are dry.

9. The method of claim 5 wherein, following mixing the at least one food grade binder with the partially scrambled egg, the partially-scrambled egg is fully cooked by heating to a temperature of about 70° to about 80° C. taking about 7 to about 15 minutes until the cooked eggs are dry.

10. The method of claim 1 wherein said fully-cooked scrambled egg is shaped by extruding the fully-cooked scrambled egg in a desired cross-sectional shape followed by cutting the extruded scrambled egg into desired longitudinal lengths.

11. The method of claim 10 wherein said extruding step is effected at a temperature of about 2° to about 18° C.

12. The method of claim 11 wherein said temperature of about 50° to about 10° C.

13. The method of claim 1 wherein the battered product is breaded.

14. The method of claim 13 wherein the battered and breaded product is par-fried prior to freezing the par-fried product.

* * * * *